Dec. 16, 1969 — W. J. PLANKENHORN — 3,484,357
ELECTROPHORETIC DEPOSITION OF CERAMIC COATINGS
Filed April 3, 1967
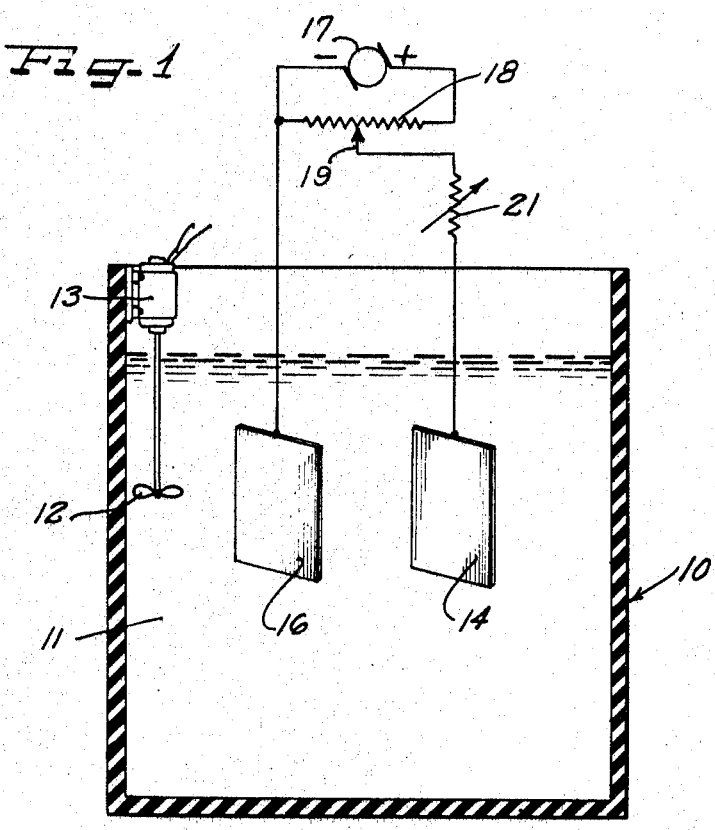
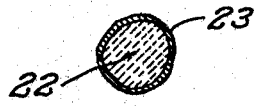
INVENTOR.
William Joseph Plankenhorn United States Patent Office 3,484,357
Patented Dec. 16, 1969

3,484,357
ELECTROPHORETIC DEPOSITION OF CERAMIC COATINGS
William Joseph Plankenhorn, Lombard, Ill., assignor to Eagle-Picher Industries, Inc., Cincinnati, Ohio, a corporation of Ohio
Filed Apr. 3, 1967, Ser. No. 628,111
Int. Cl. C23b 13/00; B01k 5/02
U.S. Cl. 204—181                          8 Claims

ABSTRACT OF THE DISCLOSURE

Electrophoretic deposition process for ceramic coatings or the like, particularly porcelain enamel frit, wherein the individual ceramic particles are encapsulated with an inorganic gel before being dispersed in the slurry used for electrophoretic deposition of the particles onto a substrate.

BACKGROUND OF THE INVENTION

Field of the invention

This invention is in the field of electrophoretic deposition of particles, and provides improvements whereby higher voltages can be employed, electrolysis at the anode can be minimized, a self-limiting characteristic is achieved, and the deposition can take place effectively from an aqueous medium.

Electrophoretic deposition is based upon the phenomenon observed over one hundred and fifty years ago, that when a D.C. potential is applied across two electrodes which are dipped into a dispersion of colloidal or near colloidal size, the particles will migrate to one of the electrodes where their charge is neutralized and they are deposited. This type of coating has been used in the past only to a limited extent commercially, principally in the fields of depositing emissive and insulating materials on electron tube filaments, the formation of rubber articles by deposition of latex on a mandrel, and similar processes. Such commercial applications have met with various disadvantages. For one, articles having irregular shapes were not uniformly coated. For another, some processes evidenced an excessive electrolysis at the anode (the article to be coated). For another, most processes of this type made use of nonaqueous organic solvents such as alcohols or ketones which were quite volatile and provided not only problems due to their volatility but also due to their flammability. In some types of processes, the potential gradient which could be established was rather limited due to the nature of the particles and the electrolyte so that the mobility of the fine particles was inherently limited.

Description of the prior art

There has been a considerable amount of development work done on electrophoretic coatings, particularly applied to electrically insulating coatings for wires and the like. The following list represents to me rather typical disclosures in this field from patents and other literature: Kraner, U.S. Patent No. 1,907,984; Cardell, U.S. Patent No. 2,307,018; Verwey et al., U.S. Patent No. 2,321,439; Ruben, U.S. Patent No. 2,327,462; Robinson, U.S. Patent No. 2,386,634; Ruben, U.S. Patent No. 2,393,068; Robinson et al., U.S. Patent No. 2,421,652; Robinson et al., U.S. Patent No. 2,478,322; Snyder, U.S. Patent No. 2,530,546; Dorst, U.S. Patent No. 2,650,975; McBride, U.S. Patent No. 2,739,085; Thomson, U.S. Patent No. 2,956,937; Seaward, U.S. Patent No. 3,034,971; Weisel et al., U.S. Patent No. 3,093,511; German Patent No. 666,930; Shaw "Electrophoretic Techniques for Depositing Ceramic Coatings" Industrial Finishing, July 1964, pp. 43–44.

SUMMARY OF THE INVENTION

In the method of the present invention, electrically insulating particles such as porcelain enamel frit are deposited upon a substrate by first encapsulating them in an inorganic gel such as a silica gel and then dispersing the encapsulated particles into a slurry containing colloidal silica and preferably a suspending agent such as bentonite. The frit particles should be on the order of less than 100 microns in dimension, and preferably less than 40 microns. While organic materials can be included in the electrolyte, the process works entirely satisfactorily in a strictly aqueous medium. Through the use of the process of the present invention, higher potential differences can be employed between the electrodes and less electrolysis occurs at the surface of the article being coated. Furthermore, the process evidences a self-limiting characteristic in that when the deposited material reaches a given thickness in any area, further deposition is substantially reduced or terminated, and the deposition proceeds in those areas where the required thickness of coating has not been obtained, until all surfaces are uniformly coated.

BRIEF DESCRIPTION OF THE DRAWINGS

FIGURE 1 is a somewhat schematic view of an electrophoretic coating cell of the type which can be used in accordance with the present invention; and FIGURE 2 is a greatly enlarged cross-sectional view of an encapsulated frit particle which is dispersed in the electrophoretic coating bath electrolyte.

DESCRIPTION OF THE PREFERRED EMBODIMENTS

In the electrophoretic cell of FIGURE 1, reference numeral 10 indicates generally a container composed of electrical insulating material. A slurry 11 is maintained within the container 10, and is agitated to keep the suspension as uniform as possible by means of an impeller 12 driven by a motor 13.

The article to be coated which, in the drawings, is shown to be a flat plate 14 is connected as the anode in the electrical circuit. One or more cathodes 16 are provided in spaced relation to the anode 14 within the bath. A D.C. generator 17 or other suitable power source provides a potential between the anode 14 and the cathode 16, the output of the generator 17 being impressed across a potentiometer 18 whose variable arm 19 is connected to the anode 14 through a current regulating variable resistor 21. While the voltage on current conditions can be varied depending upon the specific material being coated, in the process of this invention, the applied potential is usually on the order of 40 volts or more, and the current density is typically 10 amperes per square foot or less.

The composition of the slurry 11 forms an important feature of the present invention. The actual particles which are electrophoretically deposited on the anode 14 are shown in the greatly enlarged view of FIGURE 2 as constituting a core frit particle 22 encapsulated by means of an inorganic gel coating 23. The size of the frit particles should not be in excess of about 100 microns and preferably 40 microns or less.

The preferred encapsulating material is a silica gel. The technique of preparing silica gels is well known in the art, particularly in the field of catalysis. Adhesive silica gel can be prepared by hydrolyzing tetraethyl orthosilicate, ethyl polysilicates, or combinations of the orthosilicate and polysilicates. Encapsulation of the frit particles can also be accomplished with a colloidal silica aqueous sol of the type marketed commercially as "Nalcoag," but this material appears to be somewhat less effective than the preferred hydrolyzed ethyl silicates.

In addition to silica gels, it is possible to encapsulate the frit particles with gels based on alumina or zirconia. After drying of the gel, the encapsulated frit particles are then dispersed in a suitable electrolyte which contains colloidal silica, a dispersing agent such as bentonite and water. The dispersing agent usually constitutes from about 0.1 to 10% by weight of the slurry electrolyte, and sufficient colloidal silica is present to provide an electrolyte which is sufficiently viscous to suspend the particles adequately but is not so viscous that it is difficult to keep agitated.

The following specific example illustrates the preferred process more completely.

Example

The encapsulating solution was prepared by mixing 18.9 volumes of ethyl silicate, 81.1 volumes of denatured ethyl alcohol (95%) and less than 0.1% of hydrochloric acid as a catalyst. Sufficient water was present in the alcohol and in the acid catalyst to provide for complete hydrolysis. Preground porcelain enamel frit, having a particle size of —325 mesh was stirred into the solution and the stirring was continued until gelation occurred. The mixture was dried in air, and then dried in an oven at 225° C.

The encapsulated particles (575 g.) were ball milled for one hour in an admixture with 15 grams of colloidal silica, 5 grams of bentonite and 800 cc. of distilled or deionized water. The resulting suspension was introduced into an electrophoresis cell, with the article to be plated being used as the anode. The potential difference between the electrodes was 60 volts, the current density was 1.6 amperes per 0.2 square foot of surface area, and the deposition time was 30 to 45 seconds.

Under these conditions, the process had a self-limiting characteristic which provided a uniform thickness of coating over all surfaces of the work piece regardless of the configuration or time of exposure. It was observed that when the deposited material reached a given thickness in any area, further deposition would not occur in this area, but would continue where the limiting thickness had not been obtained until all the surfaces were uniformly coated.

It was also found that encapsulation tends to limit the solubility of the alkali constituents of the frit. Limiting the presence of alkali ions tends to control the resistance in the system, maintaining the desired low conductivity.

Using the same type of electrolyte, but with non-encapsulated frit particles, it was necessary to go to a higher current density at a lower voltage to prevent excessive electrolysis at the anode.

After application of the electrophoretically deposited coating, the coated object can be removed from the cell and then fired in the usual way to provide a vitreous coating over the piece.

From the foregoing, it will be understood that the process of the present invention possesses certain advantages over other types of electrophoretic deposition processes for the application of porcelain enamel frits to metal parts. It should also be evident that various modifications can be made to the described embodiments without departing from the scope of the present invention.

I claim as my invention:

1. The method of depositing finely divided electrically insulating inorganic particles onto a substrate which comprises encapsulating said particles with an inorganic gel, suspending the resulting encapsulated particles in an electrolyte slurry, and thereafter electrophoretically depositing the suspended particles on a substrate.

2. The method of claim 1 in which said insulating particles are particles of a porcelain enamel frit.

3. The method of claim 1 in which said inorganic gel is a silica gel.

4. The method of claim 1 in which said inorganic gel is the hydrolysis product of ethyl silicate.

5. The method of claim 1 in which said electrolyte slurry contains aqueous colloidal silica.

6. The method of claim 1 in which said electrolyte slurry contains colloidal silica, bentonite and water.

7. The method of claim 1 in which the electrophoretic deposition is carried out at an applied voltage of at least 40 volts.

8. The method of depositing a porcelain enamel frit onto a substrate which comprises encapsulating frit particles having a particle size no greater than about 100 microns in a silica gel, suspending the resulting encapsulated particles in a slurry of colloidal silica, bentonite and water, and then electropheoretically depositing the suspended particles on a substrate.

References Cited

UNITED STATES PATENTS

| | | | |
|---|---|---|---|
| 1,907,984 | 5/1933 | Kraner | 204—181 |
| 2,307,018 | 1/1943 | Cardell | 204—181 |
| 2,321,439 | 6/1943 | Verwey et al. | 204—181 |
| 2,327,462 | 8/1943 | Ruben | 204—181 |
| 2,421,652 | 6/1947 | Robinson et al. | 204—181 |
| 2,478,322 | 8/1949 | Robinson et al. | 204—181 |
| 2,650,975 | 9/1953 | Dorst | 204—181 |
| 2,707,703 | 5/1955 | Dorst | 204—181 |
| 2,734,857 | 2/1956 | Snyder | 204—181 |
| 2,739,085 | 3/1956 | McBride | 204—181 |
| 3,093,511 | 6/1963 | Weisel et al. | 204—181 |

FOREIGN PATENTS

| | | |
|---|---|---|
| 518,554 | 2/1940 | Great Britain. |
| 655,763 | 8/1951 | Great Britain. |

HOWARD S. WILLIAMS, Primary Examiner

E. ZAGARELLA, Jr., Assistant Examiner